United States Patent
Blanco

(10) Patent No.: US 11,868,354 B2
(45) Date of Patent: Jan. 9, 2024

(54) APPARATUS, SYSTEM, AND METHOD FOR RESPONDING TO A USER-INITIATED QUERY WITH A CONTEXT-BASED RESPONSE

(71) Applicant: MOTOROLA SOLUTIONS, INC., Schaumburg, IL (US)

(72) Inventor: Alejandro G. Blanco, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1379 days.

(21) Appl. No.: 14/863,072

(22) Filed: Sep. 23, 2015

(65) Prior Publication Data

US 2017/0083584 A1 Mar. 23, 2017

(51) Int. Cl.
*G06F 16/00* (2019.01)
*G06F 16/2457* (2019.01)
(Continued)

(52) U.S. Cl.
CPC .. *G06F 16/24573* (2019.01); *G06F 16/24575* (2019.01); *G06F 16/951* (2019.01); *G06N 3/006* (2013.01); *H04B 1/38* (2013.01)

(58) Field of Classification Search
CPC ............. G06F 16/951; G06F 16/24573; G06F 16/24575; G06F 16/90324; G06F 16/90335
(Continued)

(56) References Cited

U.S. PATENT DOCUMENTS 5,848,407 A * 12/1998 Ishikawa ................. G06F 16/94
707/999.005
6,477,387 B1 11/2002 Jackson et al.
(Continued)

FOREIGN PATENT DOCUMENTS

EP 1659756 A 5/2006
WO 2011151502 12/2011
WO 2015030796 A1 3/2015

OTHER PUBLICATIONS

Siri—Wikikpedia the Free Encylopedia, "How to stop Apple and Google tracking your every move using your smartphone GPS," Sep. 2015, XP055311606, Retrieved from the Internet: URL:https://en.wikipedia.org/w/index.php?title=Siri&oldid=682044481[retrieved on Oct. 18, 2016] p. 1-10.
(Continued)

*Primary Examiner* — Mariela Reyes
*Assistant Examiner* — Rezwanul Mahmood
(74) *Attorney, Agent, or Firm* — Michael Best & Friedrich LLP

(57) ABSTRACT

Systems, methods, and computer-readable medium containing instructions for responding to a user-initiated query. One method includes logging data received through an input interface of a communication device, receiving the user-initiated query, and determining a context-based response to the user-initiated query based on the logged data stored in the at least one data base and a probability of a user of the communication device receiving the logged data stored in the at least one data base. The method also includes providing the context-based response in reply to the user-initiated query.

34 Claims, 7 Drawing Sheets

(51) Int. Cl.
*H04B 1/38* (2015.01)
*G06F 16/951* (2019.01)
*G06N 3/006* (2023.01)

(58) Field of Classification Search
USPC ............................................. 707/770
See application file for complete search history.

(56) References Cited

U.S. PATENT DOCUMENTS

| | | | |
|---|---|---|---|
| 6,829,942 B2 | 12/2004 | Yanai et al. | |
| 6,947,935 B1* | 9/2005 | Horvitz | H04N 5/76 |
| 7,409,335 B1* | 8/2008 | Horvitz | G06F 40/35 |
| | | | 707/999.005 |
| 7,739,264 B2* | 6/2010 | Jones | G06F 16/3338 |
| | | | 705/14.52 |
| 7,761,570 B1* | 7/2010 | Halley | H04L 61/4511 |
| | | | 709/246 |
| 7,844,460 B2 | 11/2010 | Charlier et al. | |
| 7,980,855 B1* | 7/2011 | Scheuring | G09B 7/02 |
| | | | 434/350 |
| 8,126,894 B2* | 2/2012 | Liu | G06F 16/951 |
| | | | 707/738 |
| 8,255,386 B1* | 8/2012 | Annau | G06F 16/22 |
| | | | 707/711 |
| 8,370,155 B2 | 2/2013 | Byrd et al. | |
| 8,447,863 B1* | 5/2013 | Francis, Jr. | G06F 16/2468 |
| | | | 709/227 |
| 8,484,190 B1* | 7/2013 | Igarashi | G06F 16/951 |
| | | | 707/765 |
| 8,631,026 B1* | 1/2014 | Tucker | G06F 16/2425 |
| | | | 707/707 |
| 8,751,481 B2* | 6/2014 | Camoglu | G06F 16/9535 |
| | | | 707/736 |
| 8,775,416 B2 | 7/2014 | Heck | |
| 8,799,188 B2 | 8/2014 | Biran et al. | |
| 8,837,906 B2 | 9/2014 | May et al. | |
| 8,938,408 B1* | 1/2015 | Serdyukov | G06N 20/00 |
| | | | 707/738 |
| 8,972,434 B2* | 3/2015 | English | G06F 16/951 |
| | | | 707/765 |
| 9,026,752 B1* | 5/2015 | Botelho | G06F 16/1748 |
| | | | 711/162 |
| 9,194,716 B1* | 11/2015 | Cutter | G01C 21/3679 |
| 9,208,231 B1* | 12/2015 | Upstill | G06F 16/9535 |
| 9,659,097 B1* | 5/2017 | Adams | G06F 16/9535 |
| 9,692,843 B1* | 6/2017 | Arini | H04N 21/25885 |
| 9,730,026 B2* | 8/2017 | Wawrowski | H04W 4/08 |
| 10,372,755 B2* | 8/2019 | Blanco | G06Q 30/0631 |
| 10,509,837 B2* | 12/2019 | Pantel | G06F 16/9535 |
| 10,685,075 B2* | 6/2020 | Blanco | G10L 17/00 |
| 11,062,371 B1* | 7/2021 | Yin | G06Q 30/0641 |
| 2003/0153343 A1 | 8/2003 | Crockett et al. | |
| 2005/0125823 A1* | 6/2005 | McCoy | H04N 21/42202 |
| | | | 348/E7.071 |
| 2005/0193414 A1* | 9/2005 | Horvitz | H04N 7/163 |
| | | | 725/89 |
| 2005/0227722 A1 | 10/2005 | Harris et al. | |
| 2006/0020547 A1* | 1/2006 | Lipsanen | H04L 67/62 |
| | | | 705/51 |
| 2006/0074671 A1 | 7/2006 | Farmaner et al. | |
| 2006/0195880 A1* | 8/2006 | Horiuchi | G06F 3/011 |
| | | | 725/35 |
| 2007/0112764 A1* | 5/2007 | Yih | G06F 16/313 |
| | | | 707/999.005 |
| 2008/0005076 A1* | 1/2008 | Payne | G06F 16/903 |
| | | | 707/E17.135 |
| 2008/0114721 A1* | 5/2008 | Jones | G06F 16/3338 |
| 2008/0300965 A1* | 12/2008 | Doe | G06Q 30/0204 |
| | | | 705/7.33 |
| 2009/0006343 A1* | 1/2009 | Platt | G06F 16/242 |
| 2009/0055179 A1 | 2/2009 | Cho et al. | |
| 2009/0259629 A1* | 10/2009 | Wei | G06F 16/3338 |
| 2010/0074446 A1* | 3/2010 | Fuchs | H04L 9/0833 |
| | | | 380/278 |
| 2010/0138410 A1* | 6/2010 | Liu | G06F 16/951 |
| | | | 707/723 |
| 2010/0248692 A1* | 9/2010 | Keller | H04W 4/21 |
| | | | 455/412.1 |
| 2011/0010367 A1* | 1/2011 | Jockish | G06Q 10/10 |
| | | | 715/764 |
| 2011/0105023 A1* | 5/2011 | Scheer | H01Q 1/242 |
| | | | 455/193.1 |
| 2011/0152708 A1* | 6/2011 | Adachi | A61B 5/38 |
| | | | 600/544 |
| 2011/0153620 A1* | 6/2011 | Coifman | G10L 15/065 |
| | | | 707/748 |
| 2011/0167077 A1* | 7/2011 | Govani | G06F 16/9537 |
| | | | 707/E17.108 |
| 2011/0208730 A1* | 8/2011 | Jiang | G06F 16/951 |
| | | | 707/738 |
| 2012/0047324 A1* | 2/2012 | Wideman | G06F 9/45558 |
| | | | 711/111 |
| 2012/0053942 A1* | 3/2012 | Minamino | G10L 15/32 |
| | | | 704/E15.001 |
| 2012/0102542 A1* | 4/2012 | Kobayashi | G06Q 10/0635 |
| | | | 726/1 |
| 2012/0244812 A1 | 9/2012 | Rosener | |
| 2012/0260165 A1* | 10/2012 | Massoulie | G06F 16/9535 |
| | | | 715/708 |
| 2013/0041896 A1* | 2/2013 | Ghani | G06F 16/3328 |
| | | | 707/E17.014 |
| 2013/0080242 A1* | 3/2013 | Alhadeff | G06F 16/957 |
| | | | 705/14.39 |
| 2013/0159404 A1 | 6/2013 | Pfaff | |
| 2013/0173571 A1* | 7/2013 | Chen | G06F 16/951 |
| | | | 707/706 |
| 2013/0191381 A1* | 7/2013 | Jin | G06F 16/24578 |
| | | | 707/728 |
| 2013/0311925 A1* | 11/2013 | Denker | G06F 16/332 |
| | | | 715/771 |
| 2013/0326250 A1* | 12/2013 | Sullivan | G06F 1/3234 |
| | | | 713/323 |
| 2013/0346077 A1* | 12/2013 | Mengibar | G06F 16/211 |
| | | | 704/235 |
| 2014/0012840 A1* | 1/2014 | Han | G06F 16/951 |
| | | | 707/723 |
| 2014/0081643 A1* | 3/2014 | John | G10L 15/08 |
| | | | 704/E21.001 |
| 2014/0082545 A1* | 3/2014 | Zhai | G06F 3/04886 |
| | | | 715/773 |
| 2014/0108370 A1 | 4/2014 | Andri et al. | |
| 2014/0143324 A1* | 5/2014 | Lessin | G06F 16/13 |
| | | | 709/204 |
| 2014/0168130 A1 | 6/2014 | Hirai | |
| 2014/0233447 A1* | 8/2014 | Ofir | H04W 76/45 |
| | | | 370/312 |
| 2014/0294161 A1 | 10/2014 | O'Conor et al. | |
| 2014/0324428 A1 | 10/2014 | Farraro | |
| 2014/0379744 A1* | 12/2014 | Kuo | G06F 16/90324 |
| | | | 707/767 |
| 2015/0045003 A1 | 2/2015 | Vora et al. | |
| 2015/0058120 A1* | 2/2015 | Guo | G06Q 30/0254 |
| | | | 705/14.52 |
| 2015/0063202 A1 | 3/2015 | Mazzarella et al. | |
| 2015/0065186 A1 | 3/2015 | Mohd Mohdi et al. | |
| 2015/0072716 A1 | 3/2015 | Klein | |
| 2015/0161989 A1 | 6/2015 | Hsu et al. | |
| 2015/0235277 A1* | 8/2015 | Bagley | G06Q 30/0275 |
| | | | 705/14.71 |
| 2015/0242907 A1* | 8/2015 | Wray | G06Q 30/0275 |
| | | | 705/14.71 |
| 2015/0326787 A1* | 11/2015 | Ozaki | H04N 23/62 |
| | | | 348/333.13 |
| 2015/0331775 A1* | 11/2015 | Slik | G06F 11/008 |
| | | | 714/42 |
| 2016/0092958 A1* | 3/2016 | Goldstein | G06Q 20/201 |
| | | | 705/26.62 |

(56) References Cited

U.S. PATENT DOCUMENTS

| | | | |
|---|---|---|---|
| 2016/0140125 A1* | 5/2016 | Goyal | G06F 16/90324 707/751 |
| 2016/0239551 A1* | 8/2016 | Ovsjanikovs | G06N 5/04 |
| 2016/0253603 A1 | 9/2016 | Washizu et al. | |
| 2016/0306798 A1 | 10/2016 | Guo et al. | |
| 2016/0321297 A1* | 11/2016 | Jurca | G06F 16/29 |
| 2016/0364382 A1* | 12/2016 | Sarikaya | G06F 40/40 |
| 2016/0372139 A1 | 12/2016 | Cho et al. | |
| 2016/0378747 A1* | 12/2016 | Orr | G10L 15/26 704/9 |
| 2017/0027514 A1* | 2/2017 | Biederman | A61B 5/1451 |
| 2017/0061968 A1* | 3/2017 | Dalmasso | G10L 17/08 |
| 2017/0083584 A1* | 3/2017 | Blanco | H04B 1/38 |
| 2017/0083622 A1* | 3/2017 | Blanco | H04L 51/046 |
| 2017/0091264 A1* | 3/2017 | Uszkoreit | G06F 16/9537 |
| 2017/0116285 A1* | 4/2017 | Dotan-Cohen | G06F 16/335 |
| 2017/0262465 A1* | 9/2017 | Goggin | H04L 67/1097 |
| 2018/0032877 A1* | 2/2018 | Jain | G06N 5/022 |
| 2018/0137267 A1* | 5/2018 | Krieger | G10L 17/00 |
| 2019/0005978 A1 | 1/2019 | Barnett et al. | |
| 2019/0050450 A1* | 2/2019 | Uszkoreit | G06F 17/18 |
| 2019/0082305 A1 | 3/2019 | Proctor | |
| 2019/0259382 A1 | 8/2019 | Stogner et al. | |
| 2019/0318035 A1* | 10/2019 | Blanco | G06F 16/9535 |

OTHER PUBLICATIONS

Hearst Magazine, "How to stop Apple and Google tracking your every move using your smartphone GPS," Jul. 24, 2015, XP055311661, Retrieved from the Internet: URL:http://www.digitalspy.com/tech/android/feature/a660030/how-to-stop-apple-and-google-tracking-your-every-move-using-your-smartphone-gps/ [retrieved on Oct. 18, 2016] p. 1-4.
PCT/US2016/048029 International Search Research Report and Written Opinion dated Oct. 25, 2016 (10 Pages).
Office Action from the US Patent and Trademark Office for U.S. Appl. No. 14/862,759 dated Oct. 18, 2017 (19 pages).
Office Action from the US Patent and Trademark Office for U.S. Appl. No. 14/862,759 dated May 18, 2018 (16 pages).
Lewis et al., "A Reference Architecture for Group-Context-Aware Mobile Applications," specification (2013) pp. 44-63, CMU Software Engineering Institute, https://resources.sei.cmu.edu/asset_files/ConferencePaper/2012_021_001_435804.pdf.
Australian Examination Report No. 1 dated Sep. 24, 2019 for corresponding Australian Patent Application No. 2016423667 (4 pages).
Canadian Office Action dated Feb. 3, 2020 for corresponding Canadian Application No. 3,036,778 (3 pages).
Australian Examination Report No. 2 dated Jan. 10, 2020 for corresponding Australian Patent Application No. 2016423667 (3 pages).

* cited by examiner

APPARATUS, SYSTEM, AND METHOD FOR RESPONDING TO A USER-INITIATED QUERY WITH A CONTEXT-BASED RESPONSE

BACKGROUND OF THE INVENTION

Virtual assistants, such as Siri provided by Apple, Inc.® and Google Now provided by Google, Inc.®, are software applications that understand natural language and complete electronic tasks in response to user inputs. For example, virtual assistants take dictation, read a text message or an e-mail message, look up phone numbers, anticipate requests, place calls, and generate reminders.

Virtual assistants are most useful when the software application has access to contextual information associated with a user-initiated query. However, a virtual assistant may not have access to all sources of contextual information. For example, when a virtual assistant does not have access to the user's current location, the virtual assistant may respond to a request for local restaurant recommendations with a restaurant located geographically remote from the user. Similarly, when a virtual assistant does not have access to past restaurants visited by the user, the virtual assistant may respond to a request for local restaurant recommendations with a restaurant that the user recently visited or a restaurant serving a cuisine different from the user's usual cuisine. In addition, in some situations, a virtual assistant may provide a response to a user-initiated query that duplicates information the user previously received from another source. In these situations, the information provided by the virtual assistant may not be useful, and the user may need to initiate subsequent queries to obtain useful information. In a public safety setting, it is beneficial for virtual assistants to provide useful information in response to user queries to prevent subsequent requests for information, which may delay the user from providing time-critical public safety services (e.g., responding to a distress call, responding to an emergency at a correct location, and the like).

Accordingly, there is a need for systems and methods for improving the utility of a response to a user-initiated query.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
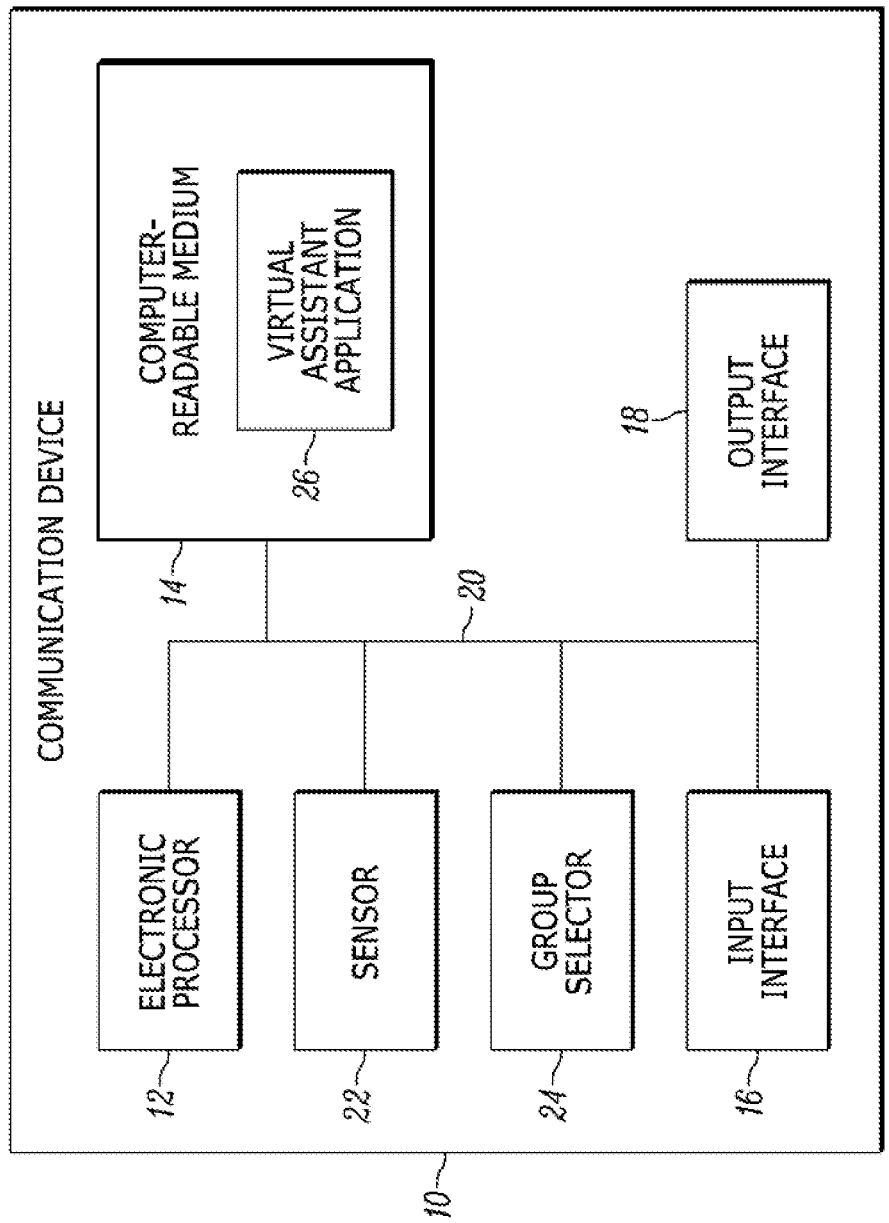
FIG. 1 is a block diagram of a communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention provide systems, methods, and non-transitory computer-readable medium containing instructions for responding to a user-initiated query. One method includes logging data received through an input interface of a communication device in at least one database. The method also includes receiving the user-initiated query and determining a context-based response to the user-initiated query based on the logged data stored in the at least one database. The method also includes providing the context-based response in reply to the user-initiated query.

Another method includes logging data received through an input interface of a communication device in at least one database. The method also includes receiving the user-initiated query and determining a context-based response to the user-initiated query based on the logged data stored in the at least one database and a probability of a user of the communication device receiving the logged data stored in the at least one database. The method also includes providing the context-based response in reply to the user-initiated query.

FIG. 1 is a block diagram of a communication device 10. The communication device 10 may be, for example, a personal computer (e.g., a desktop computer, laptop computer, or tablet computer), a mobile telephone, a watch, a television, a pager, a two-way radio, or a combination thereof. In some embodiments, the communication device 10 is a two-way radio used by public safety personnel, such as first responders and police officers.

The communication device 10 includes an electronic processor 12, non-transitory computer-readable medium 14, an input interface 16, and an output interface 18. The electronic processor 12, the computer-readable medium 14, the input interface 16, and the output interface 18 communicate through one or more communication lines or buses 20. As illustrated in FIG. 1, in some embodiments, the communication device 10 also includes a sensor 22. In some embodiments, the communication device 10 also includes a group selector 24. It should be understood that in other constructions, the communication device 10 includes additional, fewer, or different components than those illustrated in FIG. 1.

The computer-readable medium 14 (e.g., read-only memory, random-access memory, or combinations thereof) stores instructions and data. The electronic processor 12 retrieves instructions from the computer-readable medium 14 and executes the instructions to perform a set of functions including the methods described herein. For example, as illustrated in FIG. 1, the computer-readable medium 14 stores a virtual assistant application 26.

The input interface 16 receives information external to the communication device 10. For example, the input interface 16 may be a microphone (e.g., a high-audio or low-audio microphone) that captures audio information (e.g., ambient audio information and audio communication information, such as radio transmissions), a transceiver that receives information over a communication network, such as the Internet, a cellular network, or a radio network (e.g., a land mobile radio network), a selection mechanism (e.g., a button or knob), or a touchscreen. It should be understood that the communication device 10 may include more than one input interface 16.

The output interface 18 transmits information external to the communication device. For example, the output interface 18 may be speaker for outputting audio information (e.g., a high-audio or low-audio speaker), a transceiver for transmitting information over a communication network, such as the Internet or a cellular network, or a display (e.g., a liquid crystal display (LCD), light emitting diode (LED) display, or a touchscreen). It should be understood that the communication device 10 may include more than one output interface 18. Also, in some embodiments, the communication device 10 includes a device, such as a transceiver or a touchscreen, that acts as both an input interface 16 and an output interface 18. Also, is should be understood that the input interface 16, output interface 18, or a combination thereof may be included in a housing of the communication device 10 or may be external to the housing of the communication device 10. For example, in some embodiments, the communication device 10 includes an in-ear device (e.g., earbuds, bone-conducting speaker, and the like) that is connected to the communication device over a wired or wireless connection.

The sensor 22 senses environmental conditions of the communication device 10. For example, the sensor 22 may include a noise sensor that detects audio levels (e.g., ambient audio levels or audio levels of audio communication received by the communication device 10). Alternatively or in addition, the sensor 22 may include a position sensor that detects an orientation of the communication device 10 or a portion thereof. For example, the position sensor may include a proximity detector or an orientation sensor that detects whether the communication device 10 is in a horizontal or a vertical position (e.g., whether the communication device 10 in a position indicating that the communication device 10 is being used by a user). Similarly, the position sensor may include an electrical sensor (e.g., a conductive sensor or a galvanic skin response sensor as disclosed in U.S. Published Application No. 2012/0244812) that detects whether the communication device 10 or a portion thereof, such as an ear-bud, is being worn or is otherwise in a position associated with use of the communication device 10 (e.g., the communication device 10 or a portion thereof is contacting or positioned within a user's hand, ear, face, or mouth). The sensor 22 may also include a proximity sensor that detects proximity of the communication device 10 to an object, such as the user. It should be understood that in some embodiments, the communication device 10 includes more than one sensor 22.

The group selector 24 selects one or more communication groups that the communication device 10 subscribes to. For example, some types of communications (e.g., voice calls, text messages, pages, radio transmissions, and the like) may be transmitted to a group of communication devices. For example, within a public safety context, a communication is often transmitted to a group of communication devices used by a group of police officers or first responders. In some embodiments, the group selector 24 includes a mechanical input mechanism, such as a rotatable knob or a multiple-position switch that allows a user of the communication device 10 to select a particular communication group (e.g., a particular communication channel). It should be understood that, in some embodiments, the communication device 10 includes more than one group selector 24.

Figure 2:
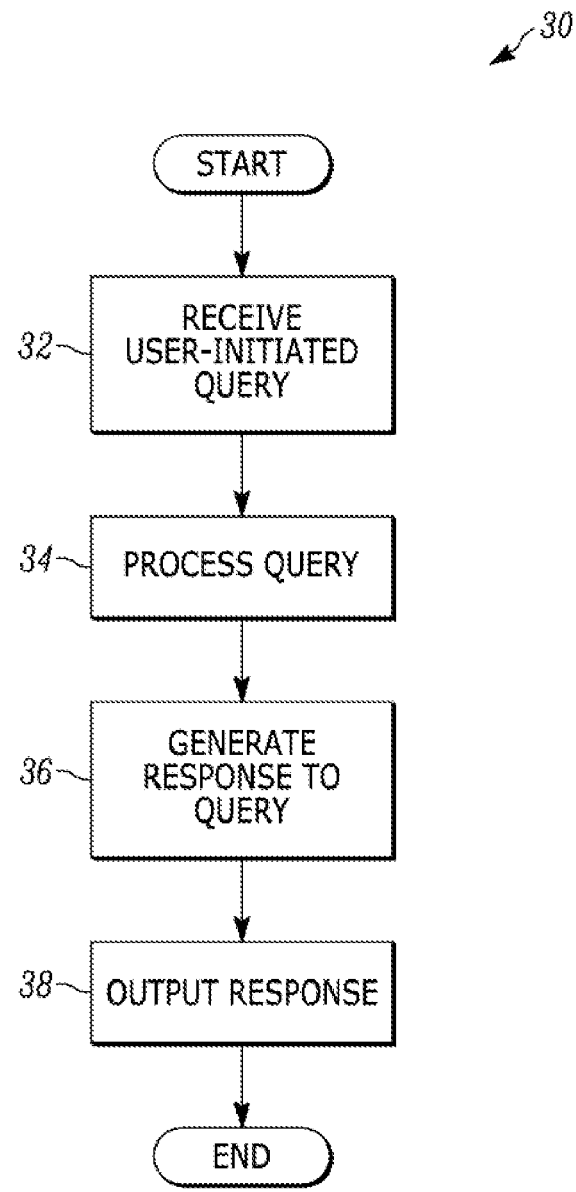
FIG. 2 is a flowchart illustrating a method of responding to a user-initiated query using the communication device of FIG. 1.

As noted above, the computer-readable medium 14 stores a virtual assistant application 26. The virtual assistant application 26 is executed by the electronic processor 12. FIG. 2 is a flow chart illustrating a method 30 performed by the virtual assistant application 26 (as executed by the electronic processor 12) to respond to a user-initiated query. As illustrated in FIG. 2, the virtual assistant application 26 receives a user-initiated query (at block 32). The user-initiated query is received through the input interface 16 and may be initiated through audio data (i.e., a spoken query), text data (i.e., a written or typed query), or a combination thereof.

The virtual assistant application 26 processes the query (at block 34). Processing the query may include performing natural language processing (NPL) on the query, which may include converting audio data into text data using automatic speed recognition (ASR). The natural language processing may also include using known techniques to convert text data into a semantic representation that allows the virtual assistant application 26 to understand the query, such as by matching one or more parts of the user-initiated query to predetermined queries (e.g., "Where is the nearest gas station?," "What is the weather like tomorrow?," and the like) to determine the subject matter of the query. In some embodiments, the virtual assistant application 26 also accesses a contextual information database to process a received query. The contextual information database provides context for the query. For example, when the query is "What is the weather like tomorrow?," the virtual assistant application 26 uses the contextual information database to identify the location associated the weather request (e.g., "What is the weather like tomorrow for Austin, Texas?").

After processing the query, the virtual assistant application 26 determines a response to the query by accessing one or more data sources (at block 36). For example, when the virtual assistant application 26 determines that the user-initiated query is "What is the weather like tomorrow for Austin, Texas," the virtual assistant application 26 accesses a data source that stores weather information for Austin, Texas.

The virtual assistant application 26 provides the response in reply to the query (at block 38). In particular, the virtual assistant application 26 outputs the response to the user through the output interface 18, such as through a speaker or a display. For example, in some embodiments, the virtual assistant application 26 converts a response into audio data for output through a speaker (e.g., using a text-to-speech software application). Alternatively or in addition, the response may be provided as text data or graphical data.

It should be understood that, in some embodiments, the functionality illustrated in FIG. 2 is performed by the virtual assistant application 26 stored in the computer-readable medium 14 of the communication device 10. In particular, the virtual assistant application 26 processes a query (e.g., performs automatic speech recognition and natural language processing) and accesses a data source stored in the computer-readable medium 14 of the communication device 10 to generate a response to the query. However, in other embodiments, portions of this functionality may be distributed among multiple applications and multiple devices.

Figure 3:
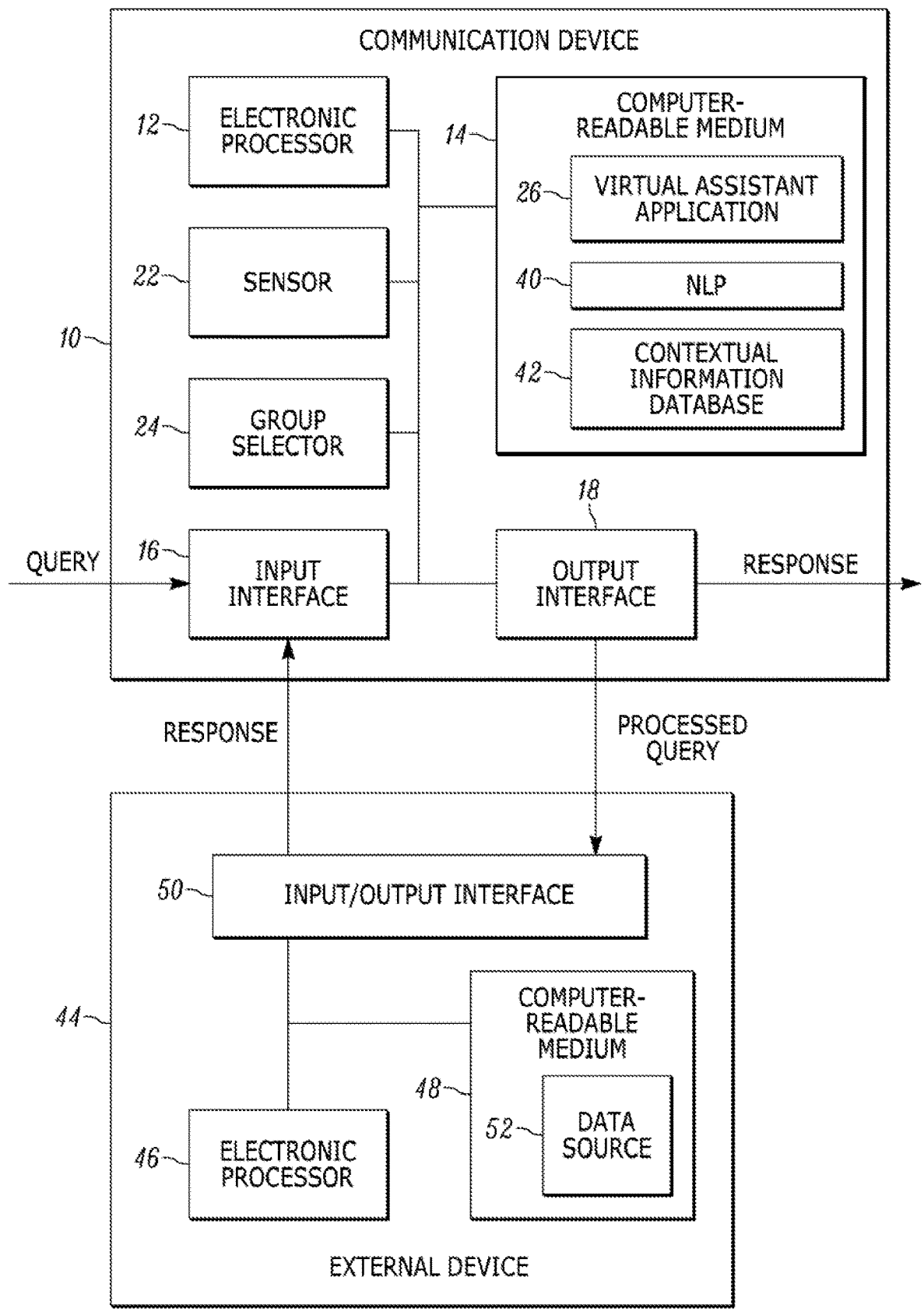
FIG. 3 is a block diagram of the communication device of FIG. 1 communicating with an external server to respond to a user-initiated query.

For example, as illustrated in FIG. 3, in some embodiments, the virtual assistant application 26 stored on the communication device 10 receives the user-initiated query, processes the query (e.g., using a natural language processing application 40 and a contextual information database 42 stored in the computer-readable medium 14), and transmits the processed query to a device 44, such as a server or another communication device, external to the communication device 10 over a communication network, such as the Internet, a cellular network, or a local area network (LAN).

The external device 44 includes an electronic processor 46, computer-readable memory 48, and an input/output interface 50 (e.g., a transceiver) for communicating with the communication device 10 over a communication network. The computer-readable memory 48 stores one or more data sources 52 used to generate a response to a query. Accordingly, the external device 44 (executing instructions with the electronic processor 46) receives a processed query from the virtual assistant application 26, generates a response based on the one or more data sources 52, and transmits the response back to the virtual assistant application 26 over the communication network, which outputs the response to the user through the output interface 18.

Similarly, in some embodiments, the virtual assistant application 26 transmits a processed query to multiple external devices to generate a response or transmits a query to an external server for automatic speech recognition and/or natural language processing in addition to or as an alternative to receiving a response. Further yet, in some embodiments, the virtual assistant application 26 accesses a contextual information database through one or more external devices in addition to or as an alternative to accessing the contextual information database 42 locally stored on the communication device 10. Accordingly, it should be understood that the functionality described in the present application as being performed by the virtual assistant application 26 may be distributed in multiple configurations and performed by one or more devices.

As noted above, the virtual assistant application 26 provides more useful information to a user of the communication device 10 when the virtual assistant application 26 is aware of contextual information associated with the user, such as the user's current location. Accordingly, in one embodiment, the virtual assistant application 26 is configured to log data received through the input interface 16 of the communication device 10 and use the logged data to respond to a user-initiated query with a context-based response as compared to simply repeating data that the user of the communication device 10 may have already (and recently) received from another human or another software application.

Figure 4A:
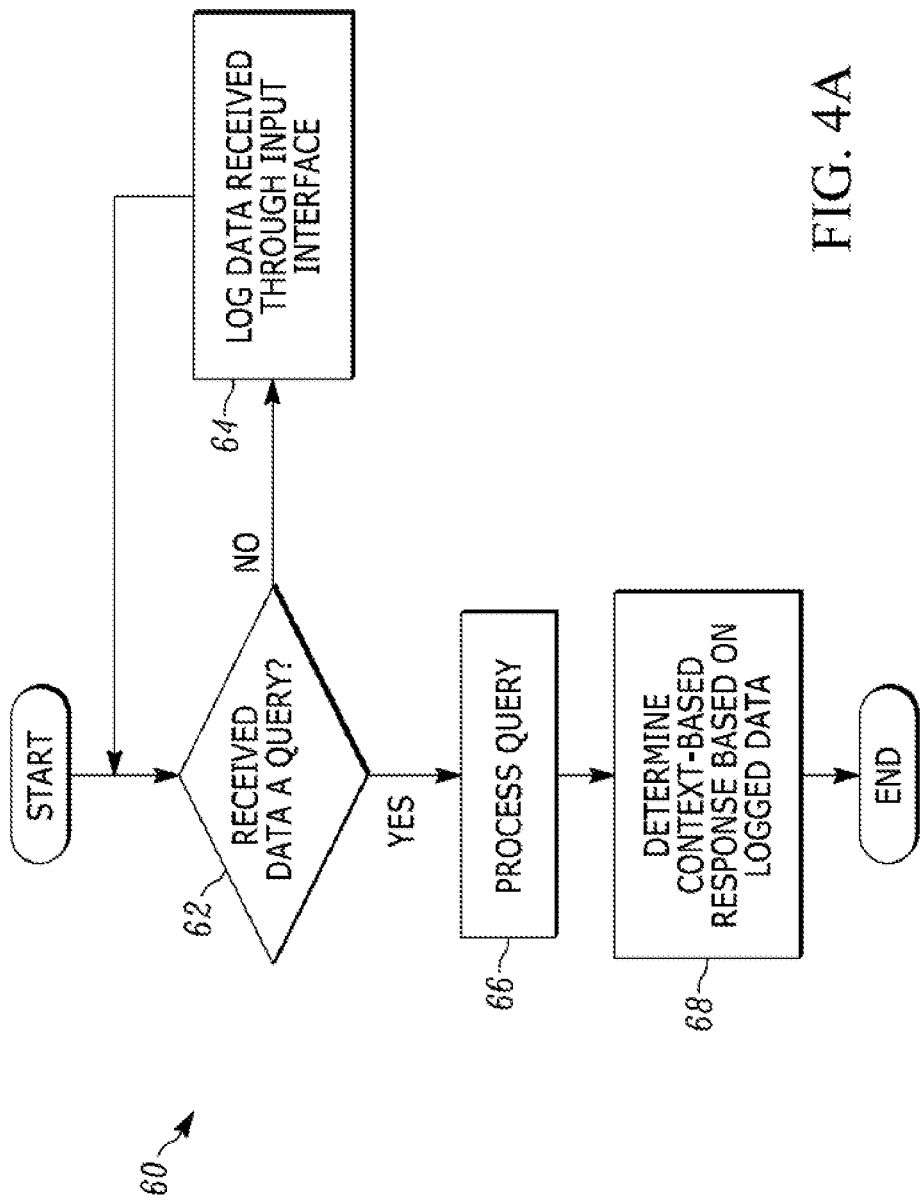
FIG. 4A is a flowchart illustrating a method of logging data received through an input interface of the communication device of FIG. 1 and responding to a user-initiated query with a context-based response based on the logged data.

For example, FIG. 4A illustrates a method 60 of logging data received through the input interface 16 of the communication device 10 and responding to a user-initiated query received by the communication device 10 based on the logged data. The method 60 is performed, at least in part, by the virtual assistant application 26 executed by the electronic processor 12 of the communication device 10.

The method 60 includes logging data received through the input interface 16 of the communication device 10. In particular, as illustrated in FIG. 4A, unless data received through the input interface 16 of the communication device 10 is a user-initiated query (at block 62), data received through the input interface 16 of the communication device 10 is continuously logged (at block 64).

The received data may include audio data. For example, in some embodiments, ambient audio data collected by a microphone included in the communication device 10 is logged. This data may include conversations involving the user of the communication device 10 and conversations involving other humans or devices physically located around the communication device 10 (e.g., a conversation being conveyed through a separate communication device 10). Alternatively or in addition, voice communications (e.g., a cellular voice communication, a two-way radio voice communication, and the like) communicated through a transceiver included in the communication device 10 are logged. In some embodiments, the logged data for voice communications includes one or multiple sides of a conversation (e.g., initial audio data from a sender, response audio data from one or more receivers, or the combination).

When the received data includes audio data, the virtual assistant application 26 uses automatic speech recognition to convert the audio data into text data. As described above with respect to FIG. 3, automatic speech recognition may be performed at the communication device 10, at an external server, or a combination thereof. For example, in some embodiments, audio data received at the communication device 10 is streamed to an external server for automatic speech recognition.

The received data may also include text data. For example, text messages, e-mail messages, pages, and other text-based communications received through a transceiver of the communication device 10 may be logged. Similarly, in some embodiments, graphical data, such as images, emoticons, web pages, and the like, received at the communication device 10 (e.g., as part of a text, an e-mail message, a webpage, and the like) may be logged.

Logging the data received through the input interface 16 of the communication device 10 may include storing the actual received data. Alternatively or in addition, logging the data received through the input interface 16 may include storing parameters of the received data, the communication device 10, or a combination thereof. For example, the parameters may include text data generated from received audio data. The parameters may also include a semantic representation of the received data generated using natural language process. The parameters may also include an index of terms or group of terms (e.g., phrases) included in the received data. The parameters may also include timing information for received data that designates the date and time the data was received by the communication device 10. The timing information may be generated based on clock information provided by the communication device 10. Alternatively or in addition, the timing information may be generated based on the received data (e.g., the date and time included in an e-mail message).

The parameters may also include a type of received data (e.g., audio, text, voice communication, ambient audio data, and the like). For example, when audio data is received by the communication device 10 through a radio transmission (e.g., a push-to-talk communication), the parameters may identify the received data as a radio transmission. Similarly, when audio data was received as a group communication, the parameters identify the received data as a group communication received over a particular communication channel.

Also, in some embodiments, the parameters include location information for the communication device 10. The location information specifies a geographic location of the communication device 10. In some embodiments, the parameters also include signal strength information representing a signal strength available to the communication device 10 for receiving particular types of data (e.g., voice communications).

The parameters may also include data from the sensor 22 that tracks environmental conditions of the communication device 10. For example, as noted above, the sensor 22 may provide data indicating an ambient noise level around the communication device 10, an orientation of the communication device 10, and the like. In some embodiments, data from the sensor 22 is continuously logged, which allows data from the sensors 22 to be mapped to data received at any date or time. Alternatively, data from the sensor 22 may be logged only in connection with received data. It should also be understood that, in some embodiments, logged data described herein as being detected by the sensor 22 can be generated by other components included in the communication device 10. For example, in some embodiments, a microphone included in the communication device 10 can be configured to process received audio data (e.g., using software executed by an electronic processor included in the microphone or the communication device 10) to identify an ambient noise level of the audio data without the need for a noise sensor. In either situation, however, an ambient noise level can be logged and used as described herein.

Also, in some embodiments, the parameters include a position of the group selector 24 and associated timing information. This information indicates what groups the communication device 10 subscribed to during a particular time period. Therefore, when group communications are separately tracked (e.g., stored on a server external to the communication device 10), logging the position of the group selector 24 for the communication device 10 and associated timing information allows group communications to be mapped to the communication device 10. For example, in situations where data transmitted to the communication device 10 is stored on a server external to the communication device 10, the virtual assistant application 26 may be configured to access the stored communications, identify one or more communications transmitted to the communication device 10 (e.g., by identifying a communication group the communication device 10 is a member of based on the group selector 24 and the time communications were transmitted), and log data based on the identified communications.

In some embodiments, the parameters also include discrete data elements of a data record. For example, within the public safety context, received data may be mapped to discrete data elements of an "incident" record (e.g., location, type of incident, and the like). Therefore, logging data received through the input interface 16 may include storing received data, or portions thereof, with associated data element or data record identifiers.

The logged data is stored to at least one database. In some embodiments, the logged data, or portions thereof, is locally stored on the communication device 10 (e.g., within the computer-readable medium 14). For example, the logged data may be stored in the contextual information database 42. However, in other embodiments, the logged data, or portions thereof, is stored on an external server accessible by the communication device 10. In some embodiments, logged data is retained for a predetermined period of time before being discarded (e.g., for data storage efficiencies).

As illustrated in FIG. 4A, when the communication device receives a user-initiated query (at block 62), the virtual assistant application 26 processes the query as described above with respect to FIG. 2 (at block 66), such as by performing natural language processing. The virtual assistant application 26 then determines a context-based response to the query (at block 68), which is provided in reply to the query through the communication device 10. In particular, the virtual assistant application 26 determines a context-based response to the query based on the logged data to provide a response that does not merely repeat information previously received by the user of the communication device 10 from another source (e.g., another software application or another human).

For example, when the user asks "What is the location of the fire?," the virtual assistant application 26 may provide a response of "El Paso." However, when the user previously received a communication (e.g., a group communication over a radio network) of "Fire reported in El Paso," responding to the user's query with a response of "El Paso" may not provide the user with useful information. Accordingly, rather than repeating this information to the user, the virtual assistant application 26 determines a context-based response to the query based on the logged data that includes at least some information not previously-received by the communication device 10.

Figure 4B:
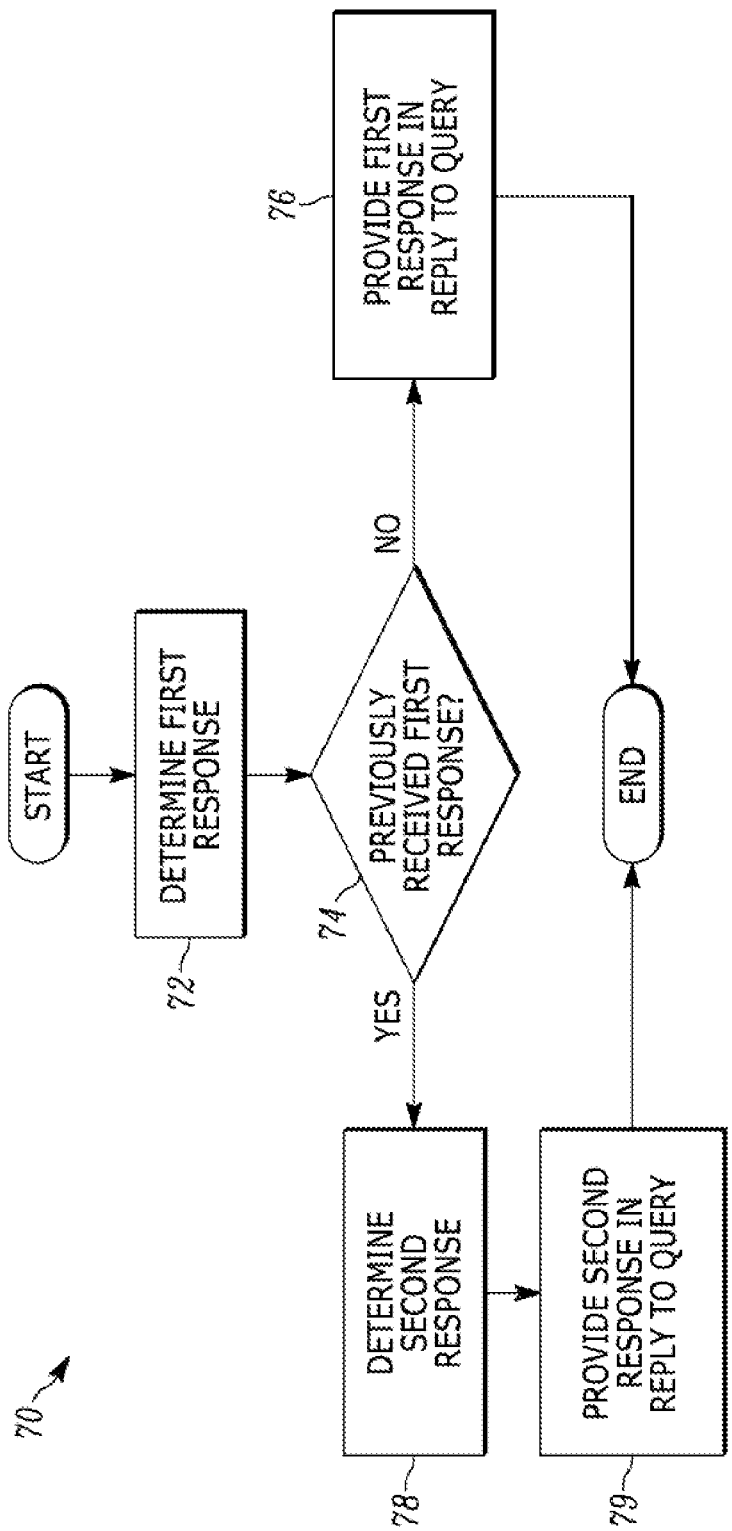
FIG. 4B is a flowchart illustrating a method of determining a context-based response for use with the method of FIG. 4A according to one embodiment.

FIG. 4B illustrates one method 70 of determining a context-based response for use with the method 60. As illustrated in FIG. 4B, the virtual assistant application 26 determines a first, initial response to the user-initiated query by accessing one or more data sources (at block 72). The virtual assistant application 26 then compares the first response to the logged data to determine whether the communication device 10 previously received the first response (at block 74). For example, the first response may be compared to the logged data see whether any previously-received data included the first response or a portion thereof (e.g., whether any of the terms or groups of terms included in previously-received data match any of the terms or groups of terms included in the first response). In particular, the first response (or a semantic representation of the same) may be compared with semantic representations stored as part of the logged data to perform a semantic comparison.

When, based on the logged data, the communication device 10 did not previously receive the first response, the first response is provided in reply to the user-initiated query (at block 76). In particular, the first response is output through the output interface 18 of the communication device 10 (e.g., as audio data, text data, or a combination thereof), such as through a speaker or a display.

When, based on the logged data, the communication device 10 previously received the first response, a second response is determined (at block 78) and provided in reply to the user-initiated query (at block 79) (e.g., through a speaker or a display as audio data, text data, or a combination thereof). For example, similar to how the first response was determined, one or more data sources may be accessed to identify a second response to the user-initiated query, which may include a modification of the first response (e.g., the first response with additional information not previously received by the communication device 10). In particular, returning to the example provided above, when the user asked "What is the location of the fire?," rather than responding with a response of "El Paso," a response of "123

Main Street" is provided. In some embodiments, the second response is similarly compared with logged data to determine whether the second response has already been received by the communication device 10. This process may continue until a response is generated that the communication device 10 has not previously received or a predetermined number of responses have been generated. For example, returning to the example above, a possible third response may be "10$^{th}$ floor on the east side."

In some embodiments, one or more rules are applied when a response to a user-initiated query was previously received by the communication device 10. The rules may consider when a response was previously received by the communication device 10. For example, when the communication device 10 previously received a response but the communication device 10 received the response more than a predetermined time in the past (e.g., received the response more than 30 days ago), the response may still be provided in reply to the query. In some embodiments, these rules are configurable (e.g., through the virtual assistant application 26) on a per-user-basis.

Figure 5A:
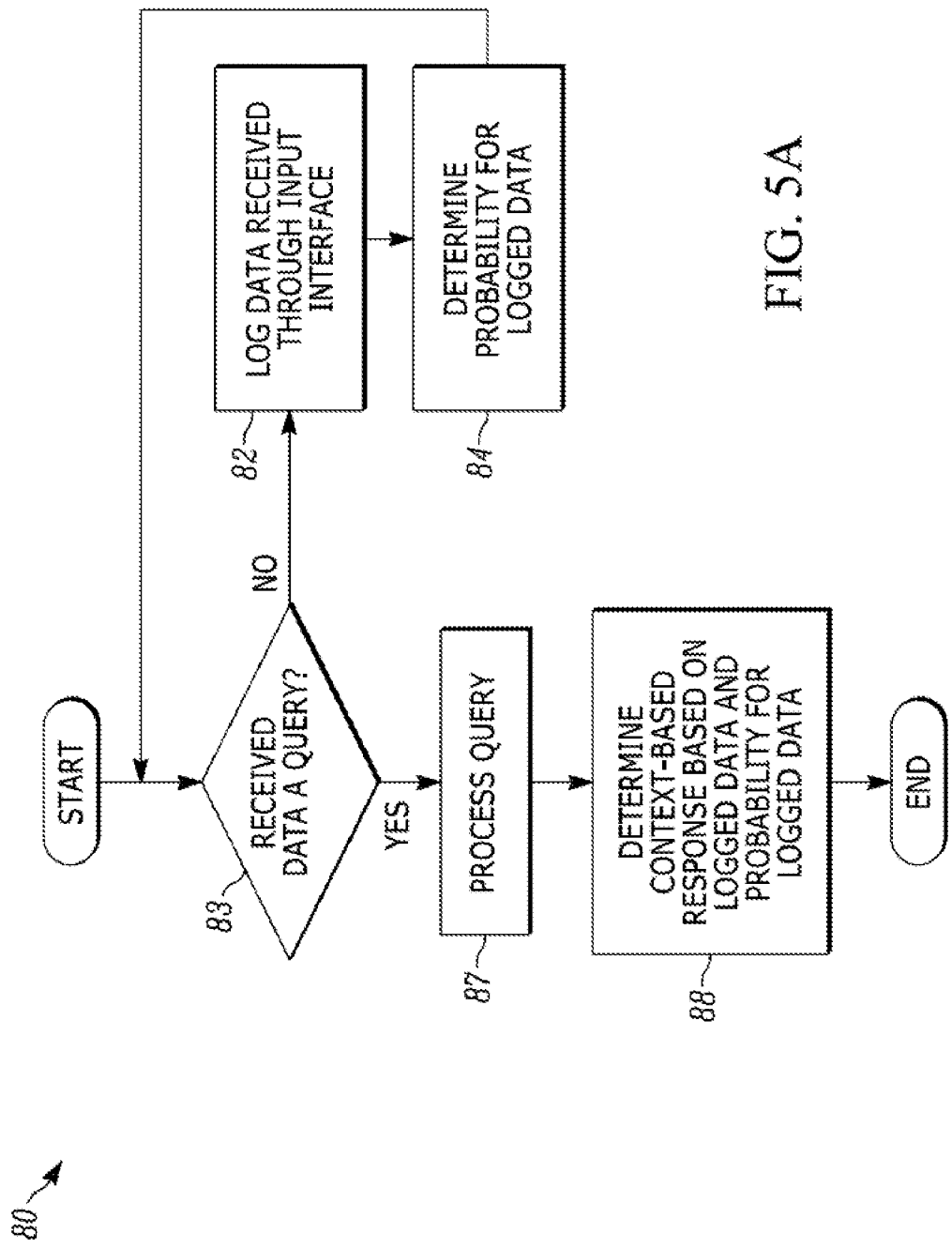
FIG. 5A is a flowchart illustrating a method of logging data received through an input interface of the communication device of FIG. 1 and responding to a user-initiated query with a context-based response based on the logged data and a probability of a user of the communication device receiving the data.

In addition, in some embodiments, a probability is determined for data received through the communication device 10 that indicates the likelihood that the user of the communication device 10 received (e.g., heard, read, and the like) the data. For example, FIG. 5A illustrates a method 80 of logging data received through the input interface 16 of the communication device 10 and responding to a user-initiated query received by the communication device 10 based on the logged data and a likelihood that received data was received by the user of the communication device 10. The method 80 is performed, at least in part, by the virtual assistant application 26 executed by the electronic processor 12 of the communication device 10.

Similar to the method 60 illustrated in FIG. 4A, the method 80 includes continuously logging data received through the input interface 16 of the communication device 10 in at least one at least one database (at block 82) (i.e., unless received data is a user-initiated query (at block 83)). However, in the embodiment illustrated in FIG. 5A, in addition to logging the received data, a probability is also determined for received data (at block 84).

As noted above, the probability specifies the likelihood that the user of the communication device 10 received the data (e.g., heard, read, or viewed the data in such a way that the user could comprehend the data). A probability may be represented as a percentage from 0% to 100%, wherein a probability of 0% indicates a low probability that the user received the data and a probability of 100% indicates a high probability that the user received the data.

In some embodiments, the probability is based on an environmental condition (e.g., sensed by the sensor 22). For example, as noted above, the sensor 22 or a microphone included in the communication device 10 may determine ambient noise levels. When the ambient noise level exceeds a particular level, the user may not have been able to hear received audio data. Therefore, in these situations, the probability may be set to a low value (e.g., less than or equal to 50%). Similarly, in some embodiments, data from the sensor 22 is used to determine motion of the communication device 10. For example, depending on whether the user of the communication device 10 was stationary or moving (e.g., running) may impact whether the user heard received audio data or read received text data.

Also, in some embodiments, the probability is based on an orientation of the communication device 10 when data is received. For example, as noted above, the sensor 22 may sense an orientation of the communication device 10. Accordingly, this information may be used to determine the position of the output interface 18 of the communication device 10 relative to the position of the user when the data was received. For example, the orientation of the communication device 10 may be used to determine whether the user was looking at a display of the communication device 10 (e.g., to read text data), whether the speaker was positioned near (e.g., next to or within) the user's ear, whether the communication device 10 was positioned within a holster, and the like, which impacts the likelihood of the user receiving the data.

Similarly, the probability may be based on user interaction with the communication device 10 when the data was received. For example, data from the sensor 22 may be used to perform eye-tracking to identify a portion of the communication device 10 the user was looking when the data was received. Also, the probability may be based on an activity level of the user. For example, the time of the last interaction between the user and the communication device 10 (e.g., the last time the user selected a button or other selection mechanism included in the communication device) indicates whether the user is actively using the communication device 10 and, therefore, whether the user likely received data.

Alternatively or in addition, the probability may be based on the received data. For example, the probability for audio data received at the communication device 10 may be based on the volume level of the audio data. Loud audio data is more likely heard by a user than quiet audio data. Similarly, the probability for audio data may be based on a number of speakers identified in the data. For example, when multiple speakers are speaking at the same time, it may be difficult for the user of the communication device 10 to hear what each speaker is saying. In addition, background noise contained in audio data may make it difficult for the user to hear a relevant data included in the audio data. Furthermore, the language used in the received data (e.g., audio data or text data) may be used to set the probability. For example, an e-mail message received in German likely is not comprehended by a user who only speaks English.

The probability may also be based on the time (e.g., date, time, or the combination thereof) the data was received. For example, data received when a user of the communication device 10 was off-duty may have a lower probability of being received by the user than data received while the user was on duty. In addition, the probability may be based on the type of received data. For example, direct communications may be more likely received by a user than group communications, which may or may not be relevant to the user.

Also, the probability may be based on the location of the communication device 10 or the signal strength available to the communication device 10. For example, as noted above, in some embodiments, an external server tracks data transmitted to the communication device 10, such as group communications, and this separately-tracked data can be used to identify data previously sent to the communication device 10. However, in some situations, data transmitted to the communication device 10 may not actually be received by the communication device 10. For example, the location of the communication device 10 or the signal strength available to the communication device 10 at the time the data was transmitted may prevent the communication device 10 from actually receiving the transmitted data. To identify these situations, the location of the communication device 10 and/or the signal strength available to the communication device 10 can be logged. Accordingly, rather than assuming that data transmitted to the communication device 10 was actually received, a probability can be assigned to the transmitted data based on the location and/or signal strength of the communication device 10. For example, when the communication device 10 was located outside of a coverage area when a group communication was transmitted to the communication device 10, the probability associated with the transmitted data can be set to 0%. Similarly, when any errors occurred during the transmission of data to the communication device (e.g., as tracked by a server external to the communication device 10), the errors can be used to set the probability associated with the communication.

Also, in some embodiments, the probability is based on whether data received at the communication device 10 was received from the user of the communication device 10. For example, when the data received through the input interface 16 of the communication device 10 was a voice communication initiated by the user of the communication device 10, the probability of the user receiving the data may be set at a high level (e.g., 100%) since the user was the source of the data.

As illustrated in FIG. 5A, when a user-initiated query is received (at block 83), the query is processed (at block 87), and a context-based response is determined (at block 88), which is provided in reply to the user-initiated query. In particular, the virtual assistant application 26 determines a context-based response to the query based on the logged data, including a probability that previously-received data was actually received by the user of the communication device 10. Accordingly, the virtual assistant application 26 does not repeat information previously received by the user of the communication device 10 from another source (e.g., another software application or another human) unless it is unlikely that the user of the communication device 10 actually received the data (e.g., the probability associated with the previously-received data is less than a predetermined threshold).

Figure 5B:
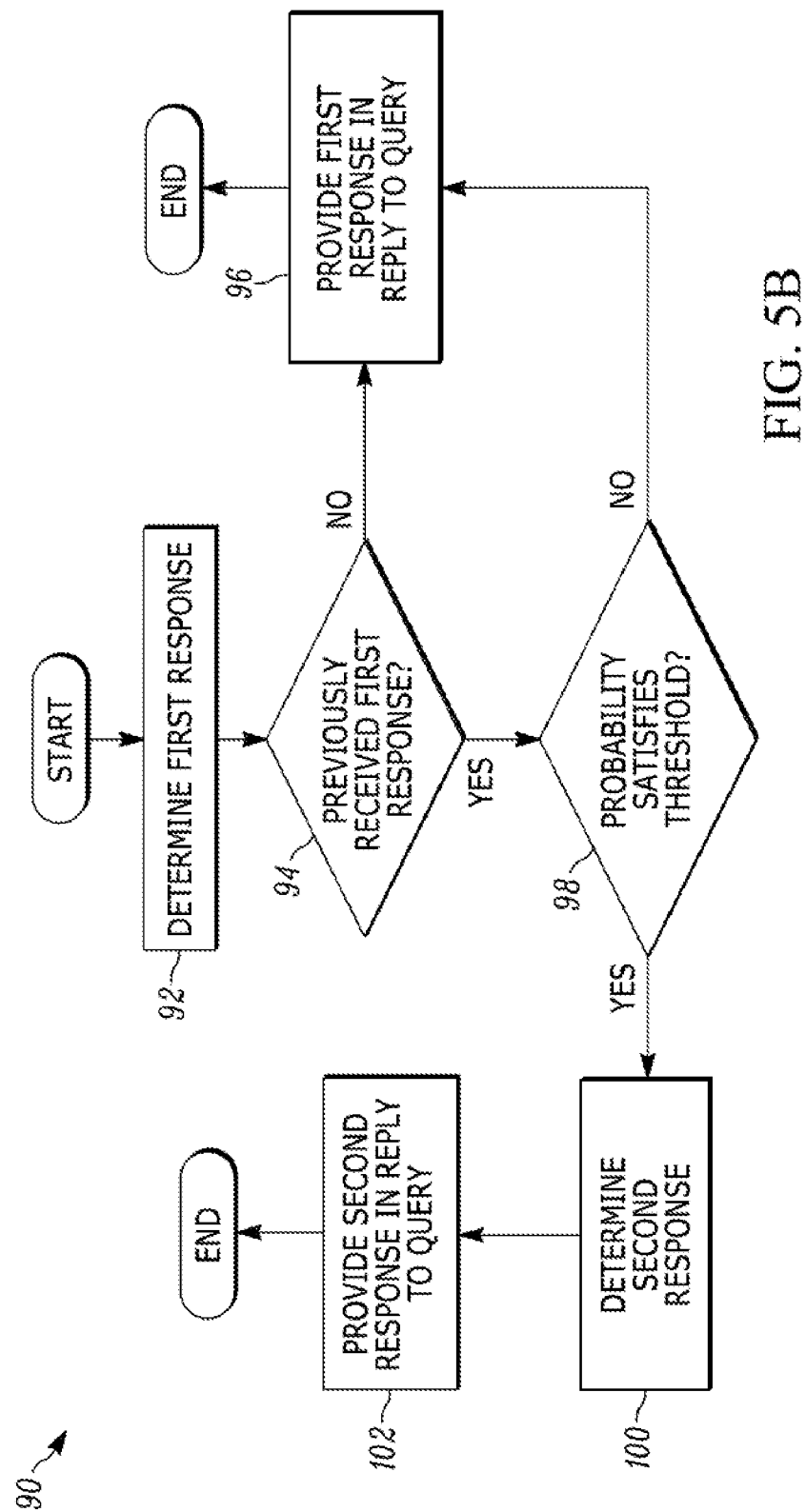
FIG. 5B is a flow chart illustrating a method of determining a context-based response for use with the method of FIG. 5A according to one embodiment.

For example, FIG. 5B illustrates a method 90 for determining a context-based response for use with the method 80. As illustrated in FIG. 5B, a first response to the query is determined (at block 92) as described above with respect to FIG. 4B. The first response is then compared with the logged data to determine whether the first response was previously received by the communication device 10 (at block 94) as also described above with respect to FIG. 4B. When the first response was not previously received by the communication device 10, the first response is provided in reply to the query (at block 96).

However, when the first response was previously received by the communication device 10, the probability associated with the previously-received data is compared to a predetermined threshold (at block 98). For example, when percentages between 0% and 100% are used as probabilities, a probability may be compared to a predetermined percentage threshold, such as, for example, 50%. In some embodiments, the threshold is configurable (e.g., through the virtual assistant application 26) on a per-user-basis.

As illustrated in FIG. 5B, when the probability for the previously-received data does not satisfy the predetermined threshold (e.g., the probability is less than the threshold indicating that there is a low likelihood that the user of the communication device 10 received the data), the first response is provided in reply to the query (at block 96). When the probability for the previously-received data satisfies the predetermined threshold (e.g., the probability is equal to or exceeds the threshold indicating that there is a high likelihood that the user of the communication device 10 received the data), a second response is determined (at block 100) and provided in reply to the query (at block 102) as described above with respect to FIG. 4B.

It should be understood that in some embodiments, a probability is determined for data received by the communication device 10 as part of logging the data. Alternatively or in addition, a probability may be determined when a response is identified as being previously-received by the communication device 10. For example, as noted above, the logged data may include data received from the sensor 22, location information, timing information, and signal strength information, which may be used to determine a probability for data received by the communication device 10 at a particular time. Determining a probability when a response was previously-received by the communication device 10 reduces the amount of data processing associated with logging received data. Also, determining a probability when a response was previously-received by the communication device 10 may take into account characteristics of the user-initiated query. For example, the probability may be based on whether the user initiating the query was also the source of the previously-received data. In particular, in some embodiments, a speaker of the previously-received data and the speaker of the user-initiated query are identified. When the speakers match (i.e., the data previously received through the input interface 16 originated from the same user who made the query), the probability may be set to a high value (e.g., 100%). In some embodiments, speaker identification techniques are used to identify whether the speaker of previously-received data is the same individual as the user initiating the query.

It should be understood that the user-initiated query may be an active query (e.g., a question directed to the virtual assistant application 26) or a passive query (e.g., a question based on other actions taken by the user through the communication device 10 or data received through the communication device 10). For example, in some embodiments, when the probability for particular received data is so low that it is unlikely that the user of the communication device 10 received the data (e.g., the probability is less than 10%), the virtual assistant application 26 may alert the user that received data is available that the user likely did not previously receive. The virtual assistant application 26 may also prompt the user to select whether this data should be provided. Accordingly, the user may select whether he or she wants to receive the data (e.g., as a replay of the previously-received data). Furthermore, in some embodiments, a user may take a particular action through the communication device 10 and the virtual assistant application 26 may recognize that the user needs particular data to perform the action (e.g., log an incident, compose a message, and the like). Therefore, in these situations, the virtual assistant application 26 may similarly alert the user that relevant data is available and may prompt the user to select whether this data should be provided. Also, in some embodiments, the virtual assistant application 26 may be configured to automatically replay the previously-received data in these situations (e.g., without waiting for a selection from the user).

Also, in some embodiments, when providing a response to a query, logged data is offered to support the response. For example, when a response is determined that was previously-received by the communication device 10, the previously-received data may be offered as part of the response (e.g., by replaying the previously-received data). Similarly, when a second response was generated after a first response was identified as being previously received by the communication device 10, the first response and the second response may be provided. For example, in some embodiments, the virtual assistant application 26 alerts the user that one response to the query was previously-received by the communication device 10 and offers to replay the previously-received data.

Thus, embodiments of the invention provide systems and methods for improving the utility of responses to user-initiated query by considering what data has been previously received at a particular communication device and considering whether the previously-received data was likely received by a user of the communication device. These considerations allow a virtual assistant application to provide more useful information in response to a user-initiated query. It should be understood that data received by a communication device may be tied to a particular user of the communication device. Accordingly, in some embodiments, a user logs into or otherwise authenticates himself or herself with a communication device, and the virtual assistant application executed by the communication device logs received data and associates the logged data with the current user of the communication device (e.g., as tracked by a data record). Accordingly, when responding to a query from the current user, the virtual assistant application can access logged data for the current user as compared to logged data for a communication device regardless of what user was actually operating the communication device. Also, when logging data for a particular user, a log may include data received at more than one communication device when the user operated multiple communication devices (e.g., the logged data can be combined and stored on a server or a communication device may be configured to communicate with other communication devices to build a multiple-device log). Similarly, in some embodiments, when a user logs out of a communication device, the virtual assistant application executed by the communication device may discard previously-logged data and start a new log when a new user logs into the communication device.

Also, it should be understood that in some embodiments, data output through an output interface of a communication device is also logged and used to determine what the user of the communication device knows or to determine the likelihood that the user received particular data. For example, when a user responded to an email received through a communication device, there is a high (e.g., 100%) likelihood that the user received the original email.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of responding to a user-initiated query, the method comprising:
    logging data received through an input interface of a communication device, in at least one database, wherein the logged data includes at least one selected from the group consisting of a type of received data, location information for the communication device at the time the communication device received the logged data, and a sensed environmental condition for the communication device at the time the communication device received the logged data;
    receiving, by the communication device, the user-initiated query;
    determining, with an electronic processor, a context-based response to the user-initiated query based on the logged data stored in the at least one database;
    determining a probability that a user of the communication device previously heard, read, or viewed the logged data in such a way that the user could comprehend the logged data based on at least one selected from the group consisting of the type of received data, the location information for the communication device at the time the communication device received the logged data, and the sensed environmental condition for the communication device at the time the communication device received the logged data; and
    providing, with the electronic processor, the context-based response in reply to the user-initiated query.

2. The method of claim 1, wherein determining the context-based response to the user-initiated query includes:
    determining a first response to the user-initiated query,
    determining whether the communication device previously received the first response based on the logged data stored in the at least one database,
    determining a probability of the user of the communication device receiving the first response, and
    comparing the probability of the user of the communication device receiving the first response to a predetermined threshold.

3. The method of claim 2, wherein providing the context-based response in reply to the user-initiated query includes:
    providing the first response in reply to the user-initiated query when the communication device did not previously receive the first response,
    providing the first response in reply to the user-initiated query when the communication device previously received the first response and the probability fails to satisfy the predetermined threshold, and
    providing a second response in reply to the user-initiated query when the communication device previously received the first response and the probability satisfies the predetermined threshold.

4. The method of claim 1, further comprising determining the probability as part of logging the data.

5. The method of claim 1, further comprising determining the probability based on an ambient noise level experienced by the communication device when the communication device received the logged data.

6. The method of claim 1, further comprising determining the probability based on motion of the communication device when the communication device received the logged data.

7. The method of claim 1, further comprising determining the probability based on an orientation of the communication device when the communication device received the logged data.

8. The method of claim 7, wherein determining the probability based on the orientation of the communication device when the communication device received the logged data includes determining a position of a speaker of the communication device relative to a position of the user when the communication device received the logged data.

9. The method of claim 1, further comprising determining the probability based on a portion of the communication device receiving user interaction when the communication device received the logged data.

10. The method of claim 1, further comprising determining the probability based on a time of a last user interaction received by the communication device prior to when the communication device received the logged data.

11. The method of claim 1, further comprising determining the probability based on an audio level of the logged data when the communication device received the logged data.

12. The method of claim 1, further comprising determining the probability based on a number of speakers identified in the logged data received by the communication device.

13. The method of claim 1, further comprising determining the probability based on background noise included in the logged data received by the communication device.

14. The method of claim 1, further comprising determining the probability based on a language of the logged data received by the communication device.

15. The method of claim 1, further comprising determining the probability based on a time the logged data was received by the communication device.

16. The method of claim 1, further comprising determining the probability based on a location of the communication device when the logged data was transmitted to the communication device.

17. The method of claim 1, further comprising determining the probability based on a signal strength available to the communication device when the logged data was transmitted to the communication device.

18. The method of claim 1, further comprising determining the probability based on whether an error occurred when the logged data was transmitted to the communication device.

19. The method of claim 1, further comprising determining the probability based on whether the logged data received by the communication device originated from the user.

20. The method of claim 1, further comprising determining a first speaker associated with the user-initiated query and determining a second speaker of the logged data received by the communication device and determining the probability based on whether the first speaker and the second speaker match.

21. The method of claim 1, wherein logging the data received through the input interface of the communication device includes associating the logged data with a current user of the communication device.

22. The method of claim 1, wherein
    the communication device is capable of membership in at least one of a plurality of communications groups, the logged data includes information associating the logged data with one of the plurality of communications groups, and determining the probability includes determining which of the plurality of communications groups the communication device was a member of at the time the communication device received the logged data.

23. A communication device comprising:
an input interface;
an output interface; and
an electronic processor configured to
log data received through the input interface in at least one database, wherein the logged data includes at least one selected from the group consisting of a type of received data, location information for the communication device at the time the communication device received the logged data, and a sensed environmental condition for the communication device at the time the communication device received the logged data;
receive a user-initiated query,
determine a context-based response to the user-initiated query based on the logged data stored in the at least one database;
determine a probability that a user of the communication device previously heard, read, or viewed the logged data in such a way that the user could comprehend the logged data based on at least one selected from the group consisting of the type of received data, the location information for the communication device at the time the communication device received the logged data, and the sensed environmental condition for the communication device at the time the communication device received the logged data, and
provide the context-based response in reply to the user-initiated query on the output interface.

24. The communication device of claim 23, wherein the electronic processor is further configured to detect an ambient noise level when the communication device received the logged data and wherein the electronic processor is configured to determine the probability based on the ambient noise level.

25. The communication device of claim 23, further comprising a sensor configured to detect an orientation of the communication device when the communication device received the logged data and wherein the electronic processor is configured to determine the probability based on the orientation of the communication device.

26. The communication device of claim 25, wherein the sensor is configured to detect whether at least a portion of the communication device is being worn by the user.

27. The communication device of claim 25, wherein the sensor includes at least one selected from the group consisting of a conductive sensor and a galvanic skin response sensor.

28. The communication device of claim 25, wherein the sensor is configured to perform eye-tracking of the user of the communication device when the communication device received the logged data.

29. The communication device of claim 23, wherein the electronic processor is configured to determine the probability based on at least one selected from the group consisting of a time the communication device received the logged data, a location of the communication device when the logged data was transmitted to the communication device, and a signal strength available to the communication device when the logged data was transmitted to the communication device.

30. The communication device of claim 23, wherein the electronic processor is configured to determine the probability based on at least one selected from the group consisting of an audio level of the logged data when the communication device received the logged data, a number of speakers identified in the logged data received by the communication device, and background noise included in the logged data received by the communication device.

31. The communication device of claim 23, wherein the electronic processor is configured to determine the probability based on whether the logged data received by the communication device originated from the user.

32. The communication device of claim 23, further comprising:
a group selector for selecting at least one of a plurality of communications groups;
wherein the logged data includes information associating the logged data with one of the plurality of communications groups, and
wherein the electronic processor is configured to determine the probability based on a logged position of the group selector at the time the logged data was received by the communication device.

33. A non-transitory computer-readable medium containing instructions that, when executed by an electronic processor, perform a set of functions comprising:
logging data received through an input interface of a communication device in at least one database, wherein the logged data includes at least one selected from the group consisting of a type of received data, location information for the communication device at the time the communication device received the logged data, and a sensed environmental condition for the communication device at the time the communication device received the logged data;
receiving a user-initiated query;
determining a context-based response to the user-initiated query by based on the logged data stored in the at least one database;
determining a probability that a user of the communication device previously heard, read, or viewed the logged data in such a way that the user could comprehend the logged data based on at least one selected from the group consisting of the type of received data, the location information for the communication device at the time the communication device received the logged data, and the sensed environmental condition for the communication device at the time the communication device received the logged data; and
providing the context-based response in reply to the user-initiated query.

34. The non-transitory computer-readable medium of claim 33, wherein the communication device is capable of membership in at least one of a plurality of communications groups, and the set of functions further comprises:
determining the probability by determining which of the plurality of communications groups the communication device was a member of at the time the communication device received the logged data.

* * * * *